United States Patent [19]
Grabmaier et al.

[11] 3,899,313
[45] Aug. 12, 1975

[54] METHOD OF PRODUCING A LIGHT CONDUCTING FIBER HAVING A CORE AND A CASING

[75] Inventors: Josef Grabmaier, Unterhaching; Rolf Plaettner, Ottobrunn, both of Germany

[73] Assignee: Siemens Aktiengesellschaft, Berlin & Munich, Germany

[22] Filed: June 27, 1973

[21] Appl. No.: 374,017

[30] Foreign Application Priority Data
July 13, 1972 Germany ...................... 2234521

[52] U.S. Cl. .............. 65/3; 65/DIG. 7; 117/126 GF
[51] Int. Cl. ........................................... C03c 25/02
[58] Field of Search ................ 65/3, 4, 42, DIG. 7; 117/123 A, 126 GF

[56] References Cited
UNITED STATES PATENTS

| | | | |
|---|---|---|---|
| 2,916,347 | 12/1959 | Russell | 65/3 |
| 2,976,177 | 3/1961 | Warthen | 65/3 X |
| 3,033,731 | 5/1962 | Cole | 65/4 X |
| 3,209,641 | 10/1965 | Upton | 65/3 X |
| 3,726,656 | 4/1973 | Reid et al. | 65/4 X |
| 3,737,293 | 6/1973 | Maurer | 65/DIG. 7 |

*Primary Examiner*—Robert L. Lindsay, Jr.
*Attorney, Agent, or Firm*—Hill, Gross, Simpson, Van Santen, Steadman, Chiara & Simpson

[57] ABSTRACT

A glass fiber having a central core formed of material having a relatively high index of refraction and an outer casing formed of material having a relatively low index of refraction is formed with perfect contact between the core and casing by forming a coating of casing material on the core and permitting the coating to harden. The coating may be applied by immersing the core material in a bath of casing material, by drawing the core material vertically through a bath of the casing material, or by drawing the core material in a horizontal direction under a vertical column of casing material while twisting said core material.

1 Claim, 3 Drawing Figures

METHOD OF PRODUCING A LIGHT CONDUCTING FIBER HAVING A CORE AND A CASING

BACKGROUND

1. Field of the Invention

The present invention relates to light conducting fibers and, more particularly, to fibers formed with an inner core of material having a relatively high index of refraction and an outer casing of material having a relatively low index of refraction.

2. The Prior Art

It is known that light can be transmitted for relatively great distances without substantial attenuation by means of light conducting fibers formed of materials having relatively high indexes of refraction. The surface of such fibers is surrounded by material of lower index of refraction so that internal reflection takes place at such surface and all of the light energy is retained within the interior of the fiber. Air is sometimes employed as the surrounding material of low refractive index, but it is desirable to surround the fiber with a solid casing of material so that the performance of the fiber does not depend upon the index of refraction of the gas in which it is contained or upon other aspects of its environment, such as the touching of adjacent fibers or the like. Particularly, when fibers are encased in material having an index of refraction less than that of the central portion of the fibers, the fibers may be grouped together in bundles without risk of transmission of light energy from one fiber to another.

As it is desired for the light conducting fibers to have attenuation characteristics which are as low as possible, it is essential to have a fault-free boundary between the core and casing. In the past, the formation of an encased fiber has involved the fitting together of a polished cylindrical rod of core material and a hollow tube of casing material having a polished interior surface, and the subsequent drawing out of the core and casing to form the fiber. In order to permit the rod of core material to be fitted into the hollow tube without slipping, both the rod and the tube must be formed with a slightly conical formation, so that the narrow end of the rod may be inserted through the wide end of the tube until the outer surface of the rod is in contact with the inner surface of the tube. It has been extremely difficult to polish the surfaces of these components, particularly the inner surface of the conical hollow tube. Moreover, it has been extremely difficult to insure that the surfaces between the rod and tube are in tight contacting relationship along the entire length of the rod. Any places that are not in such tight contact lead to faults and gas inclusions, which result in faulty zones in the boundary layer between the core and the casing, and form locations where scattering and absorption of the light energy takes place. This is highly undesirable, as it increases the attenuation characteristic of the fiber.

SUMMARY OF THE INVENTION

The principle object of the present invention is to provide a process of forming a fiber having a core and casing construction, which insures an ideal contact between the core material and the surrounding casing material, so that the fiber has a low attenuation characteristic.

This and other objects and advantages of the present invention will become manifest upon an examination of the accompanying drawings and the following description.

In one embodiment of the present invention, there is provided a process for forming a casing surrounding a core having a relatively high index of refraction, by heating a rod of core material, heating a quantity of casing material to its molten state, applying said molten casing material to the exterior of said rod, and permitting said casing material to solidify into a casing having an index of refraction lower than that of the core material.

BRIEF SUMMARY OF THE DRAWINGS

Reference will now be made to the accompanying drawings in which.

Figure 1:
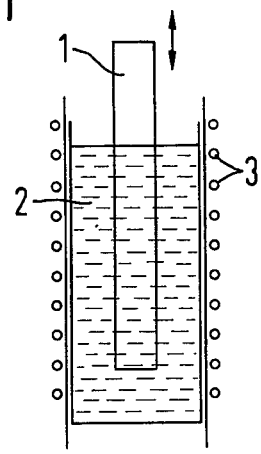
FIG. 1 is a diagrammatic illustration of a process embodying an illustrative embodiment of the present invention.

Referring now to the drawings, a first process for carrying out the present invention is illustrated in FIG. 1. A core 1 is lowered into glass melt 2 and is then withdrawn upwardly, the up and down directions being indicated by the double arrow. The coils 3 of a heating device heat the glass melt 2 to the desired temperature, so that it is maintained in a molten condition while the rod 1 is lowered thereinto and is subsequently withdrawn. The core rod 1 comprises an elongate glass rod of approximately circular cross section having a relatively high index of refraction, while the material of the glass melt 2 has a lower index of refraction.

Figure 2:
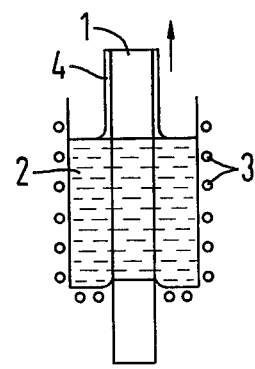
FIG. 2 is a diagrammatic representation of an alternative process incorporating the present invention.

A second process is illustrated in FIG. 2. Here the rod 1, which comprises the core of the fiber, is drawn continuously in a vertically upward direction through the glass melt 2. Heating coils 3 maintain the glass melt 2 at the appropriate temperature as the rod 1 is drawn upwardly therethrough. In the case of both processes illustrated in FIGS. 1 and 2, the casing material forms a thin coating surrounding the rod 1 and solidifies to form a casing 4 which is firmly connected with the entire outer surface of the rod 1.

Figure 3:
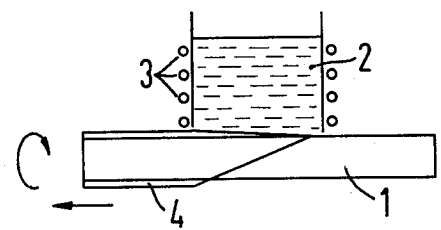
FIG. 3 is a diagrammatic illustration of another alternative process incorporating the present invention.

A third process is illustrated in FIG. 3. Here the elongate core 1 is drawn in a horizontal direction past the bottom of a vertical column containing a quantity of glass 2 maintained in a molten condition by means of the heating coils 3. The rod 1 is rotated as it is drawn past the bottom of the glass melt, so that it receives an even coating of the casing material about its entire surface, forming a casing 4 after the material solidifies.

In all three process illustrated in the drawings, the core 1 is preferably formed of quartz glass doped with $TiO_2$, while the glass melt 2 preferably comprises pure quartz glass. Thus, the casing has a lower index of refraction than the rod. It is also preferable that the coating take place in a reduced pressure. In all three cases, the core 1 is heated to a temperature which lies slightly below the fusing temperature of the rod 1, so that flaws in the core material may be avoided.

By any of the processes illustrated in the drawings, a virtually ideal contact is assured between the core material and the material of the casing, and this contact is maintained during a subsequent drawing-out process in which the core and casing are reduced in their cross section to that of an extremely fine fiber. Light fibers formed in accordance with the present invention are particularly well suited for data transmission over long distances because of the very low attenuation of light energy within the fiber.

As is well understood by those skilled in the art, the absorption of optical energy within a glass fiber is enhanced by any heavy metal ions which may be present therein. Therefore, the rod 1 and the material of which it is formed must be virtually entirely free of these impurities.

We claim:

1. A method for producing a light conducting fiber consisting of a core formed of a quartz glass doped with $TiO_2$ and a surrounding casing formed of relatively pure quartz glass, whereby the refractive index of the casing is lower than that of the core, comprising the steps of: heating the core to a temperature which is slightly below its fusing temperature, immersing the core into a melt of relatively pure quartz glass, and withdrawing the core therefrom, said immersing being carried out at a reduced pressure relative to atmospheric pressure, said immersion being carried out by pulling said core beneath and in contact with said melt in a horizontal direction while simultaneously rotating said core about its longitudinal axis.

* * * * *